(No Model.) 2 Sheets—Sheet 1.
F. BAIN.
REGULATION OF ELECTRIC MOTORS.
No. 400,890. Patented Apr. 9, 1889.
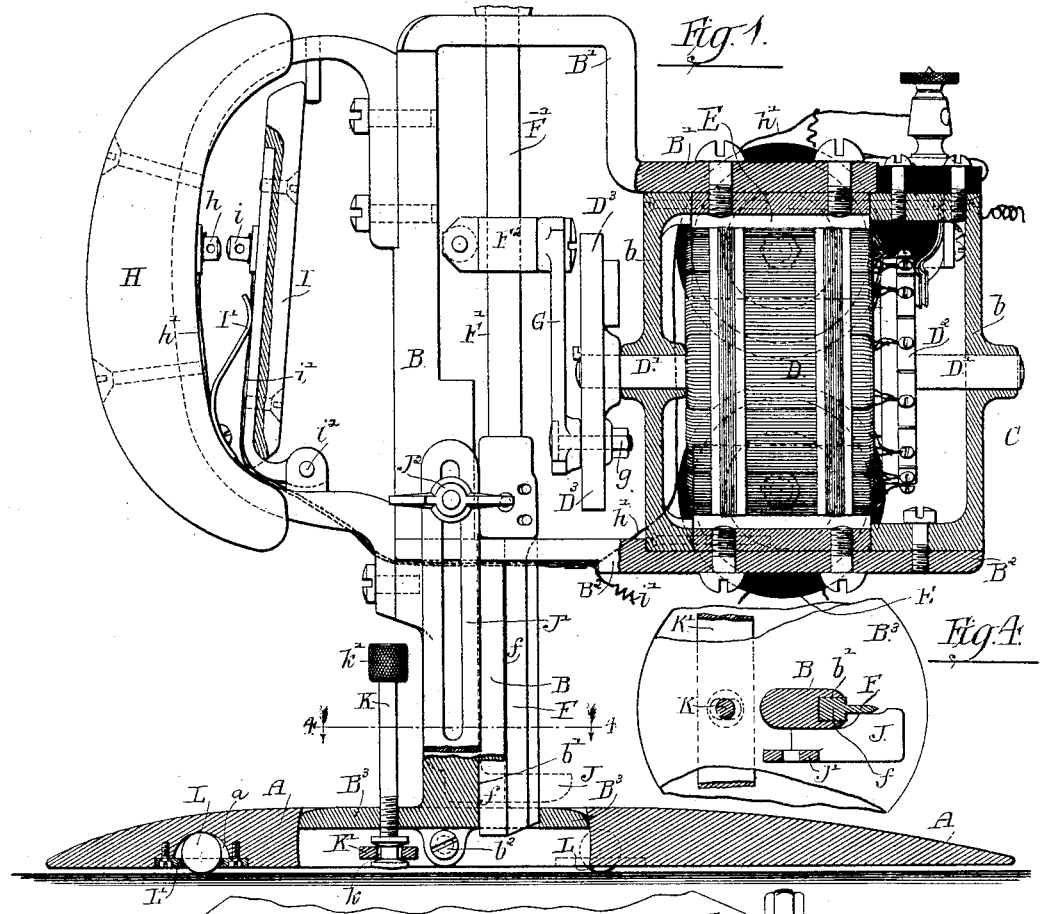
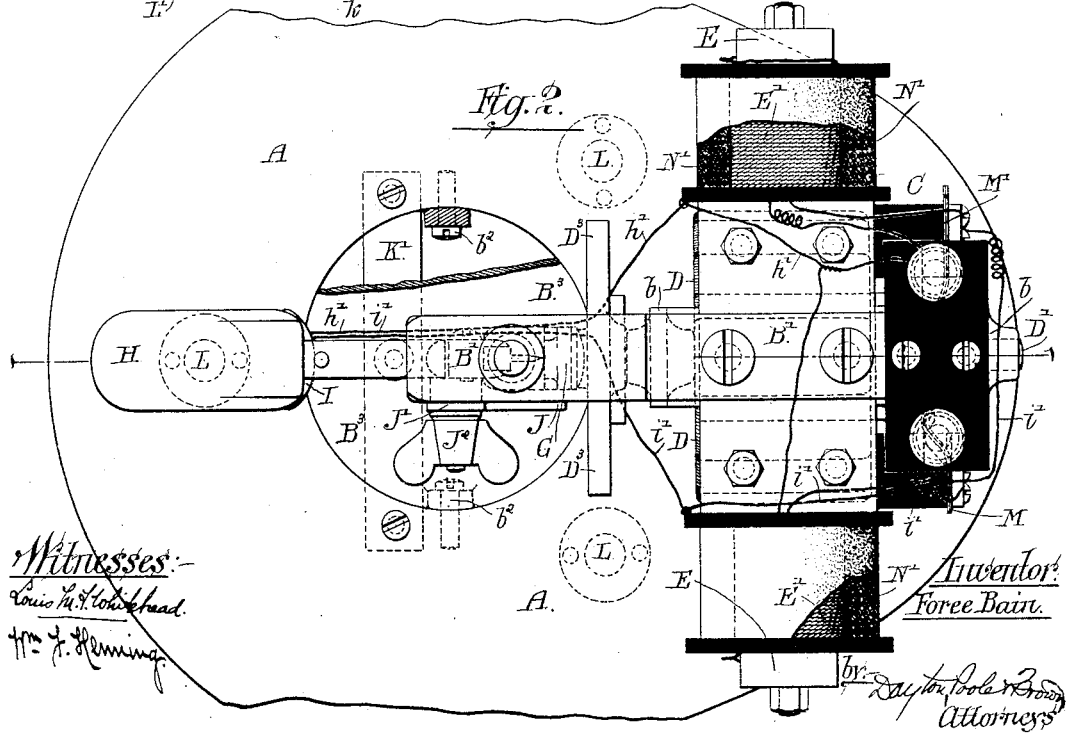
Witnesses:
Louis M. T. Lockhead.
Wm. F. Henning.
Inventor:
Foree Bain.
by Dayton Poole & Brown
Attorneys

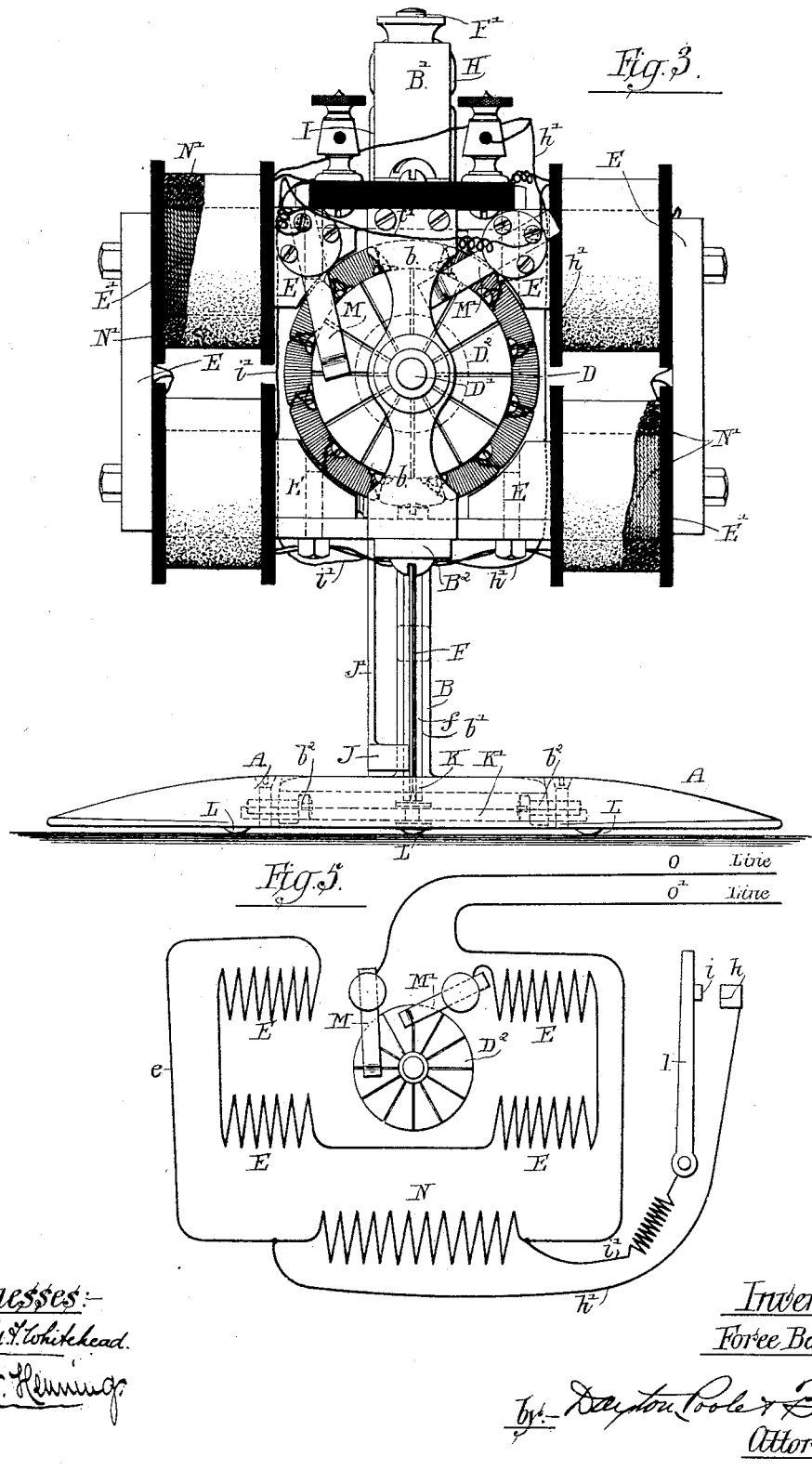

UNITED STATES PATENT OFFICE.

FORÉE BAIN, OF CHICAGO, ILLINOIS, ASSIGNOR, BY MESNE ASSIGNMENTS, TO THE ELECTRIC CUTTING MACHINE COMPANY, OF SAME PLACE.

REGULATION OF ELECTRIC MOTORS.

SPECIFICATION forming part of Letters Patent No. 400,890, dated April 9, 1889.

Application filed April 6, 1888. Serial No. 269,780. (No model.)

*To all whom it may concern:*

Be it known that I, FORÉE BAIN, of Chicago, in the county of Cook and State of Illinois, have invented certain new and useful Improvements in Cloth-Cutting Machines; and I do hereby declare that the following is a full, clear, and exact description thereof, reference being had to the accompanying drawings, and to the letters of reference marked thereon, which form a part of this specification.

This invention relates to that class of cloth-cutting machines embracing a reciprocating knife and an electric motor for actuating the same, the machine being adapted for use in cutting a number of pieces of cloth to a common pattern, as desirable in the manufacture of ready-made clothing.

The invention consists in the matters hereinafter described, and pointed out in the appended claims.

It is obviously desirable that a cloth-cutting machine actuated by an electric motor should be adapted for use in places where an actuating-current may be obtained from the conductors of an incandescent-lighting system, as well as from those of an arc-light system, and one part of my invention consists in an improved construction in the machine, whereby it may be used by being connected with conductors communicating with the supply-mains of an incandescent-lighting system. In that use of a motor arranged in multiple arc with other translating devices, or, in other words, when a motor is actuated by a current of constant potential derived from the main conductors, which also supply lights or other motors, as common in incandescent-lighting systems, the quantity of current passing through the motor is controlled or limited solely by the electric resistance in the field and armature conductors, any decrease in such resistance allowing the passage of a larger part of the current from the main conductors, while an increase of the resistance proportionately diminishes the quantity of current passing through the motor. It is a well-known fact, however, that the resistance in the armature-coils is greater when the motor is running than when the motor is not running, owing to the counter-currents generated in the armature-coils when the motor is in operation. It follows that, if a motor is so designed as to afford an electric resistance in the field and armature coils suitable for allowing the passage of current in quantity sufficient to properly actuate the machine, the resistance of the machine will be too small, and thereby allow the passage of too great a quantity of current when the machine is not running, thereby endangering the burning out of the magnets at such time. In order, therefore, to avoid danger of burning out the magnets under the circumstances stated, I employ resistance-coils through which the actuating-current may be switched or shunted when the machine is not running, and I place upon the machine a switch or contact device arranged in position for automatic operation when the operator grasps and releases the handle of the machine in using the latter, as will more fully appear in connection with the accompanying drawings illustrating my invention. When, in a motor provided with a resistance-coil in the manner described, the current is allowed to pass through the field and armature conductors while the machine is doing no work, the machine will run slowly, owing to the decrease in the quantity of current produced by the presence of the resistance-coil in the circuit. Such slow running of the motor in a cloth-cutting machine is desirable rather than the contrary, for the reason that the machine is thereby kept constantly running when not in use, so that it does not require to be started each time it is brought into action, but will be started at full speed as soon as the switch is actuated to cut out the resistance, and thereby send the full current through the field and armature coils of the motor.

The invention also embraces other features of improvement in cloth-cutting machines, as will be fully hereinafter pointed out.

In the accompanying drawings, illustrating my invention, Figure 1 is a sectional elevation of the same, taken upon line 1 1 of Fig. 2. Fig. 2 is a plan view of the same. Fig. 3 is a face view of the same. Fig. 4 is a detail section taken upon line 4 4 of Fig. 1. Fig. 5 is a diagram showing the electric circuits of the machine.

As illustrated in the said drawings, A is a flat horizontally-arranged base-plate upon which the machine is supported, and which rests and slides upon the supporting-table beneath the layers of cloth to be operated upon. Said base-plate is desirably made flat upon its under surface and convex upon its upper surface.

B is a vertical standard supported upon the disk $B^3$, and B' $B^2$ are upper and lower horizontal frame-bars attached to the standard B, for supporting the parts constituting the electric motor (indicated as a whole by C) at their outer ends.

D is a motor-armature mounted upon a shaft, D', which has bearings in vertical bars $b\ b$, attached to the frame-bars B' $B^2$.

$D^2$ is the armature-commutator, and $D^3$ the crank-disk, by means of which motion is communicated to the reciprocating knife F of the machine.

E E E E are the field-magnets, surrounded by the usual magnet-coils, E' E' E' E'.

The knife F is held or guided at its lower end in a guide-groove, b', in the standard B, and is attached at its upper end to a vertical guide-rod, F', which passes through and has bearing at its upper end in the frame-piece B'. A thickened rear part, f, of the knife, Fig. 4, fits within the groove b', and its shoulders engage an opening in the frame-bar $B^2$, shaped to conform to the knife, so as to hold the knife from lateral displacement.

$F^2$ is a block clamped to the bar F' and affording pivotal connection for one end of a connecting-rod, G, the other or lower end of which is engaged with a crank-pin, g, secured in the crank-disk $D^3$.

H is a handle attached to the side of the standard B opposite the motor, and I is a movable bar or switch, pivoted at $i^2$ adjacent to the inner face of the handle in such position that said bar I will be moved by the hand in grasping the handle.

I' is a spring attached to the handle H, and acting upon the inner face of the switch-bar I to throw the latter away from the handle, and $h\ i$ are contact-points secured to the adjacent faces of the handle and switch-bar and arranged to be brought in contact with each other when the handle and switch-bar are grasped by the hand of the operator. The contact-points $h\ i$ are connected by means of wires h' i' with the conductors of the motor, as will be hereinafter more fully set forth.

J is a presser-foot supported upon the lower end of a vertically-arranged slotted standard, J', which is adjustably supported on one side of the standard B by means of a set-screw, $J^2$.

The cutting-knife F is desirably reciprocated in a path slightly inclined from the vertical, in the manner and for the purpose fully set forth in an application for reissue of Letters Patent No. 372,926, made by Frank W. Nevans, February 24, 1888. In a knife thus constructed and operated it is sometimes desirable to adjust the angle or inclination of the knife, owing to the character of the goods being operated upon or for other reasons. To provide means for this adjustment I have connected with the base-plate A and employ an adjusting-screw, K, engaged with said parts in such relation to the pivot $b^2$ that when the screw is turned the standard will be swung about the pivot and its angular position thus changed.

As illustrated in the accompanying drawings, the standard B is attached at its lower end to a horizontal plate or disk, $B^3$, which plate or disk is fitted in a circular recess within the plate A. Said disk $B^3$ is pivotally connected with the plate by means of pivots $b^2\ b^2$, which pass through lugs on the sides of the disk and enter the said plate A.

K is a vertically-arranged adjusting-screw passing through the disk $B^3$ at the rear of the standard B, and provided at its lower end with a circumferential groove, k, which is engaged with an aperture in a cross-bar, K', the ends of which are attached to the said plate A. The screw K has screw-threaded connection with the disk $B^3$, and is provided at its upper end with a milled collar, k', by which the screw may be conveniently turned. The turning of said screw K in the disk $B^3$ will obviously have the effect of tipping said disk and thereby changing the angular position of the standard B and the knife mounted thereon.

For the purpose of enabling the machine to be more easily moved over the surface of the cutting-table upon which it rests, I have provided anti-friction bearing-rollers in its bottom, consisting of balls L L, which are inserted in recesses $a\ a$ in the under surface of the plate A, and are held therein by plates L' L', which are provided with central apertures, through which the sides of the balls project. Said balls extend downwardly below the level of the surface of the plate a sufficient distance to sustain the latter clear of the table, thereby enabling the apparatus to be easily moved or rolled about upon the table.

The disposition of the conductors in the motor may be more readily understood by reference to Fig. 5, which shows by diagram the relative location thereof. As illustrated in said Fig. 5, M M' are the brushes, acting upon the commutator $D^2$ in the usual manner. E' E' E' E' are the field-magnet coils, and N a resistance-coil.

O O' are the line-wires. The line-wire O is connected to the brush M, and the coils E at one end with the brush M' and at their opposite ends with the resistance-coil N by means of a conductor, e. The line-wire O' is connected with the opposite end of the resistance-coil N. The contact-point h on the handle is connected with the conductor e by means of the wire h', hereinbefore mentioned, while the switch-bar I is similarly connected by a wire, i', with the line-conductor O'. When the contact-points $h\ i$ are separate, the current passes from the line-wire O through the brush M, commutator, and armature, the brush M', the field-magnet coils, the conductor $e$, the resistance-coil N, and the line O'. When the contact-points $h$ $i$ are brought together, the current takes a direct course from the wire $e$ through the conductors $h'$ $i'$ to the line O', thereby avoiding the resistance M.

The resistance coil or coils may be located in any suitable place upon the machine; but, as illustrated in the accompanying drawings, said coils (indicated by N' N') are placed around the field-coils E' E', as clearly shown in the drawings, Figs. 2 and 3.

I claim as my invention—

1. In a cloth-cutting machine, the combination, with a reciprocating knife and a motor connected with and actuating the same, of a handle for controlling the movement of the machine, resistance-coils for regulating the flow of current to the motor, and an automatically-acting switch or contact device located in position to be acted upon by the operator in grasping the handle of the machine, and operating to throw the said resistance-coils into and out of circuit with the magnet and armature coils of the motor, substantially as described.

2. The combination, with the frame of a cloth-cutting machine, of a reciprocating cutter thereon, a motor for actuating the cutter, a handle attached to said frame for controlling the movement of the machine, a switch-bar movably connected with the handle, a resistance-coil, contact-points upon the switch-bar and handle, and conductors connecting said contact-points with the resistance-coil and with the field and armature coils of a motor, substantially as described.

In testimony that I claim the foregoing as my invention I affix my signature in presence of two witnesses.

FORÉE BAIN.

Witnesses:
TAYLOR E. BROWN,
HENRY A. CALDWELL.